(No Model.)
M. M. SCOTT.
CAR FENDER.
No. 536,235. Patented Mar. 26, 1895.
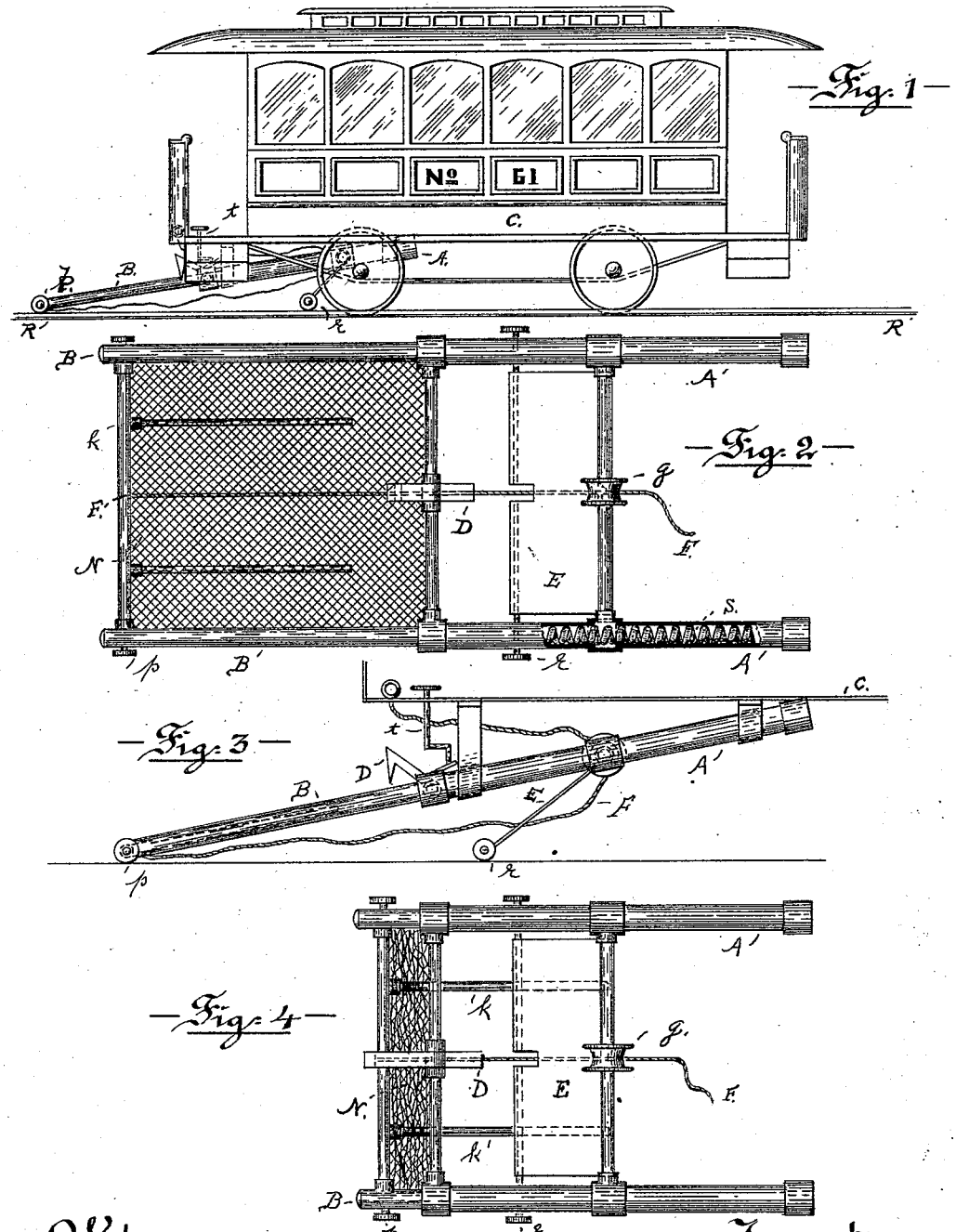

UNITED STATES PATENT OFFICE.

MAHLON M. SCOTT, OF NEWARK, NEW JERSEY, ASSIGNOR OF ONE-HALF TO ELVIN W. CRANE, OF SAME PLACE.

CAR-FENDER.

SPECIFICATION forming part of Letters Patent No. 536,235, dated March 26, 1895.

Application filed January 26, 1894. Serial No. 498,094. (No model.)

*To all whom it may concern:*

Be it known that I, MAHLON M. SCOTT, a citizen of the United States, residing at Newark, in the county of Essex and State of New Jersey, have invented certain new and useful Improvements in Car-Fenders; and I do hereby declare the following to be a full and clear description of the invention, such as will enable others skilled in the art to which it appertains to make and use the same.

My invention relates to improvements in car fenders, and is more especially applicable to street railway cars operated by the electric or cable system.

The object of my invention is to provide a fender capable of being brought into instantaneous use when required at the will of the motorman or operator in charge of the car, and at the same time be efficient and reliable in operation with no tendency to get out of order or clog by reason of mud, snow or ice accumulating thereon.

My invention consists essentially of a frame having tubular side pieces, a forward guard with its side arms telescoping therein, and a supplemental guard operated in unison with the forward guard, the fender as a whole being attached to the bottom of the car, with a forward slant thereto, and having means whereby it is under the immediate control of the motor man, both as to throwing the same into active use, and returning it to its normal or closed position.

Two fenders are necessary for the full equipment of the car, one at each end thereof.

In the drawings accompanying this specification and forming a part hereof Figure 1 is a reduced view of the fender attached to the car; Fig. 2, a plan view of the fender detached showing one of the side tubes, in horizontal cross section, exposing the spring therein; Fig. 3, a side elevation of the fender and a portion of the car body, and rail R, and Fig. 4 a plan view wherein the fender is in its closed position.

A A are the side tubes constituting a part of the general frame. These are connected together rigidly by two cross rods.

B B is the frame of the forward fender which is also connected by a rigid cross rod or tube at its forward end. I prefer using iron tubing or pipe in the construction of the entire frame work as it combines ease of assembling the same and strength and rigidness as a whole. For instance I make each side tube of two pieces, connect them by a T joint, cap the tubes on the rear end and use a T joint on the forward end. The said side tubes may then be connected by transverse tubes as shown.

The side rods of the fender B are adapted to telescope freely in the side tubes A of the frame. To limit the outward movement of the fender B its side rods may be provided with a head on their ends and the side tubes A A may have a perforated cap on their forward ends. The opening in the said cap should be of an oval form in order to permit a limited up and down play to the fender which occurs in traversing an uneven track. The said caps on the forward end can be dispensed with however and the apron or net N will limit the outward movement of the fender if desired. The said apron or net N is attached at its margin to the forward end of the fender B and to the cross bar of the frame A. It may be of any flexible material, as of leather, rubber, canvas or net work as shown. The forward fender is actuated by means of a spiral spring S, in each side tube A (see Fig. 2) the normal tendency of which is to throw the side fender B forward in line with the frame. The said fender is held in closed position by means of a catch hook D. A rod *t* pivoted to the said hook, extends upward through the car platform and within convenient reach of the operator or motor man. When the fender is to be thrown out for actual service the said hook D is released by foot pressure on the rod *t* as will be understood.

A secondary or supplemental fender E consisting preferably of a plate of sheet metal is hinged to the rear cross rod of the frame. This is held up by means of two rods *k* extending rearwardly from the forward fender. (See Fig. 4.) When the forward fender is released, the secondary fender E drops by its own gravity. (See Fig. 2.)

Both fenders may be provided with small friction wheels *p* and *r* which are adapted to run on the car track when in active use. It is evident that an upward curve of the fenders or a curved shoe could be used in place of the said rollers.

The fenders are returned to normal or closed position by means of a chain or rope F, attached to the forward fender and passing under the rear fender over a pulley $g$ and forward and up through the car platform within reach of the operator. When the said rope F, is drawn upward the effect is to pull the forward fender in closed position it being automatically locked by the catch hook D and at the same time to raise the rear fender E so that the arms $k$ pass thereunder and support it until again released.

The fender as a whole may be secured to the under side of the car by any suitable means as for instance supporting arms $y$. (See Fig. 3.)

It will be observed that the spiral springs actuating the forward fender are wholly inclosed in the side tubes thus preventing any possible obstruction in their operation by reason of dirt or ice accumulating or forming thereon; also that the entire apparatus is substantially concealed from view and entirely clears the ground when not in active use.

I claim—

1. In combination with a railway car, a fender comprising a slanting tubular frame, a guard mounted thereon and provided with rearwardly extending arms, springs actuating the said guard forwardly in line with the said frame, a flexible apron or net on the said guard, a supplemental guard hinged to the rear of the forward guard and means for operating the two in unison, substantially as described and for the purpose set forth.

2. In combination with a railway car a fender comprising a frame with parallel tubes, spiral springs therein, a guard with side rods telescoping in the said tubes, the ends of which bear against the side springs, a flexible cover on the guard rearwardly extending arms thereon, a supplemental guard hinged in the rear of the forward guard and means for operating the two in unison, substantially as described and for the purpose set forth.

3. In a car fender of the class described a frame having tubular sides, spiral springs therein, a guard having the side bars thereof in telescopic relation with the said tubes and bearing against the said springs, a supplemental guard hinged in the rear of the forward guard, arms rigidly attached to the said forward guard supporting the rear guard when in non-active use and releasing the same in unison when in active use, substantially as described and for the purpose set forth.

In testimony that I claim the invention above set forth I affix my signature in presence of two witnesses.

MAHLON M. SCOTT.

Witnesses:
VINCENT S. DENNISSON,
G. W. GEHIR.